J. P. MANSON.
POTATO VINE ARRANGER.
APPLICATION FILED NOV. 9, 1912.
1,062,021.
Patented May 20, 1913.
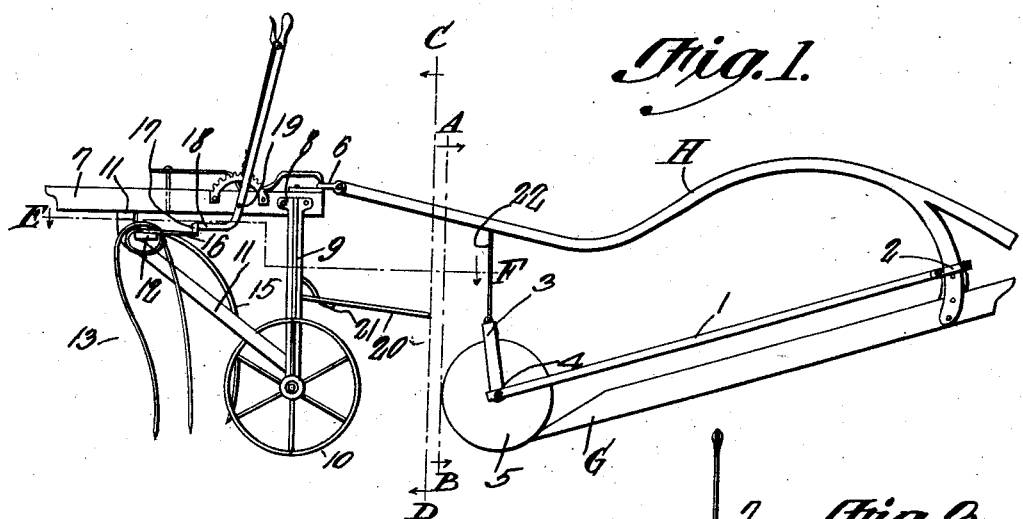
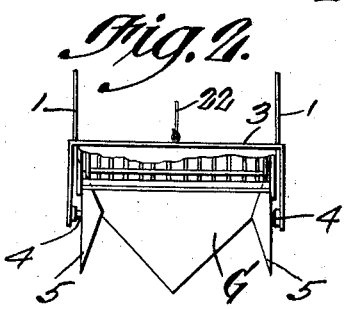
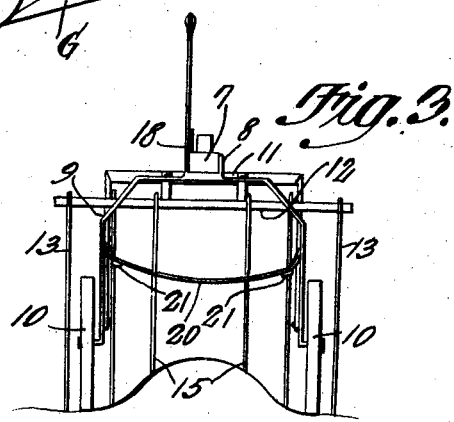
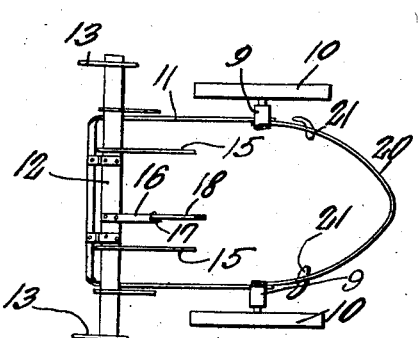
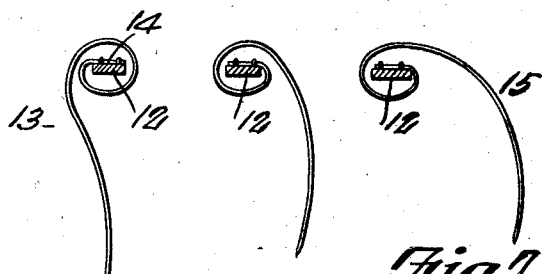
Witnesses
Joseph P. Manson, Inventor
by C. A. Snow & Co., Attorneys

UNITED STATES PATENT OFFICE.

JOSEPH P. MANSON, OF HARTLAND, MAINE.

POTATO-VINE ARRANGER.

1,062,021.

Specification of Letters Patent. Patented May 20, 1913.

Application filed November 9, 1912. Serial No. 730,479.

*To all whom it may concern:*

Be it known that I, JOSEPH P. MANSON, a citizen of the United States, residing at Hartland, in the county of Somerset and State of Maine, have invented a new and useful Potato-Vine Arranger, of which the following is a specification.

This invention relates to potato vine arranging devices and is more particularly designed as an improvement upon the structure disclosed in Patent No. 1,030,475, issued to me on June 25, 1912.

One of the objects of the invention is to provide means for not only gathering the vines toward the center of the machine but also for pulling them forward so that the roots will be presented to the digger without interference by the vines.

Another object is to provide means whereby the potatoes are prevented from falling laterally off of and under the digger where they are likely to become crushed.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of a portion of a potato digger having the present improvements combined therewith. Fig. 2 is a section on line A—B Fig. 1. Fig. 3 is a section on line C—D Fig. 1. Fig. 4 is a section on line E—F Fig. 1. Figs. 5, 6 and 7, are enlarged detail views of the teeth of the vine gatherer.

Referring to the figures by characters of reference G designates the plow of a potato digger and H designates the draw bar of the digger, the same being extended rearwardly and attached to the sides of the digger as shown. Arms 1 are pivotally connected to clamps 2 engaging the rear portion of the draw bar H and the front ends of these arms are fixedly connected in any suitable manner to the end portions of a yoke 3. Studs 4 extend inwardly from the terminal portions of the yoke and mounted for rotation on each stud is a conical wheel 5. These wheels are located close to the sides of the point of plow G and constitute means for preventing potatoes from falling over the sides of the plow and under the wheels of the machine where they will become crushed and thus rendered unfit for use.

The front portion of draw bar H is connected, by means of a clevis 6, to the rear portion of the tongue or pole 7 which is mounted, as at 8, upon an arched axle 9 supported by ground wheels 10.

A substantially U-shaped frame 11 is secured at its ends to the side portions of the arched axle 9 and, at an intermediate point, to the bottom portion of the tongue 7. Hingedly connected to the rear portion of the intermediate part of frame 11 is a cross bar 12 which extends laterally beyond the tongue and is provided, adjacent each end, with a set of spring gathering teeth. The outer tooth of each set is preferably shaped as shown in Fig. 5, the same consisting of a single length of spring metal, as shown at 13, which is coiled rearwardly over the bar 12 and thence forwardly under the bar and is finally bolted or otherwise secured upon the top face of the bar, as shown at 14. The middle tooth of each series or group is preferably formed as shown in Fig. 6, said tooth being formed in a single length of spring metal curved upwardly and over the bar 14, thence rearwardly under the bar and finally forwardly onto the top face of the bar to which it is secured by means of bolts or the like. The inner tooth of each group is preferably constructed as shown in Fig. 7 and consists of a single length of spring metal secured at one end on the bar 12 and then curved forwardly under the bar and rearwardly over the bar and finally extending downwardly and rearwardly as shown at 15.

From the foregoing it will be seen that the teeth of each group are arranged so that the outermost tooth is disposed with its point in advance of the next adjoining tooth while the point of the innermost tooth of each group is disposed back of the other points of the group. Thus any vines engaged by the teeth will be directed inwardly out of the paths of wheels 10 and toward the space between the two groups of teeth. An arm 16 is fixedly connected to and extends rearwardly from the bar 12 and is connected, by means of a link 17, to one end of a lever 18, fulcrumed as at 19, upon the tongue 7 and is provided with any suitable means for locking it against movement.

Secured to the axle 9 is a U-shaped drag member 20, the intermediate portion of the member being extended rearwardly. This member is normally supported by a stop finger 21 extending rearwardly from the axle 9. A flexible connection 22 is provided between the top of yoke 3 and the draw bar H whereby the yoke can be adjusted to bear with any desired pressure on the ground.

As the mechanism herein described is drawn forward, the fingers 13 and 15 engage the vines which are located close to the paths of the wheels 10 and deflect or gather them inwardly into line with the digger plow. The drag rod 20 then engages the vines and pulls them forwardly so that the digger plow G will engage and elevate the potatoes without interference by the vines. As the plow loosens the potatoes from the soil, the conical wheels adjacent the point of the plow serve to prevent the potatoes from rolling laterally off of the plow and into the path of the wheels of the digger. Thus a great saving of potatoes is effected inasmuch as there has been heretofore, an extensive waste due to the fact that many potatoes have become crushed under the wheels or lost in the dirt.

The arrangement of parts herein described prevents the row from splitting as the point goes under it, and it serves to keep the point clear by preventing the dirt from sticking to the point.

What is claimed is:—

1. A machine for arranging potato vines, including opposed series of vine-engaging teeth, and a rearwardly and laterally curved drag device back of the space between said series and out of contact with the ground.

2. A machine for arranging potato vines, including a cross bar, spring teeth secured to said bar and extending downwardly therefrom, said teeth being arranged in series and the lower ends of the teeth of the two series being arranged along lines converging rearwardly, and a rearwardly and laterally curved drag device supported out of contact with the ground back of the space between the two series of teeth.

3. A machine for arranging potato vines, including spaced vine engaging teeth, a drag device back of the space between the teeth, and spaced wheels supported back of the drag device.

4. A machine for arranging potato vines, including spaced vine engaging teeth, a drag device back of the space between the teeth, and oppositely disposed spaced conical wheels supported back of the drag device and mounted to move freely upwardly and downwardly.

5. A machine for arranging potato vines, including spaced vine engaging teeth, a drag device back of the space between the teeth, and opposed conical wheels supported back of the drag device and spaced to receive a plow therebetween.

6. The combination with a potato digging plow, and a draw bar, of wheel supported means connected to the draw bar and in advance of the plow, for engaging vines and directing them into line with the plow and out of the path of the wheels supporting said means, and means carried by said structure for dragging the vines forward to present their roots first to the plow point.

7. The combination with a potato digging plow, and a draw bar, of wheel supported means connected to the draw bar and in advance of the plow, for engaging vines and directing them into line with the plow and out of the path of the wheels supporting said means, means carried by said structure for dragging the vines forward to present their roots first to the plow point, and opposed wheels connected to the draw bar.

In testimony that I claim the foregoing as my own, I have hereto affixed my signature in the presence of two witnesses.

JOSEPH P. MANSON.

Witnesses:
   J. H. HALEY,
   F. S. BURRILL.

---

Copies of this patent may be obtained for five cents each, by addressing the "Commissioner of Patents, Washington, D. C."